United States Patent
Araki (10) Patent No.: US 11,189,475 B2
(45) Date of Patent: Nov. 30, 2021

(54) SAMPLE ANALYSIS METHOD AND SAMPLE INTRODUCTION DEVICE

(71) Applicant: SHIN-ETSU HANDOTAI CO., LTD., Tokyo (JP)

(72) Inventor: Kenji Araki, Annaka (JP)

(73) Assignee: SHIN-ETSU HANDOTAI CO., LTD., Tokyo (JP)

( * ) Notice: Subject to any disclaimer, the term of this patent is extended or adjusted under 35 U.S.C. 154(b) by 0 days.

(21) Appl. No.: 16/976,211

(22) PCT Filed: Dec. 20, 2018

(86) PCT No.: PCT/JP2018/046916
§ 371 (c)(1),
(2) Date: Aug. 27, 2020

(87) PCT Pub. No.: WO2019/187408
PCT Pub. Date: Oct. 3, 2019

(65) Prior Publication Data
US 2021/0005440 A1    Jan. 7, 2021

(30) Foreign Application Priority Data
Mar. 27, 2018    (JP) .............................. JP2018-059225

(51) Int. Cl.
*H01J 49/00*    (2006.01)
*H01J 49/04*    (2006.01)
(Continued)

(52) U.S. Cl.
CPC ............ *H01J 49/049* (2013.01); *G01N 27/62* (2013.01); *H01J 49/0422* (2013.01); *H01J 49/105* (2013.01); *H05H 1/30* (2013.01)

(58) Field of Classification Search
CPC .... H01J 49/049; H01J 49/0422; H01J 49/105; H01J 49/0431; H01J 49/10; H01J 49/04; G01N 27/62; H05H 1/30
(Continued)

(56) References Cited

U.S. PATENT DOCUMENTS 4,501,965 A  *  2/1985  Douglas  ................ H01J 49/067
                                                250/281
5,345,079 A  *  9/1994  French   ............... G01N 30/7273
                                                250/282
(Continued)

FOREIGN PATENT DOCUMENTS

JP           10-283980 A       10/1998
JP           2013-156150 A     8/2013
(Continued)

*Primary Examiner* — Michael Maskell
(74) *Attorney, Agent, or Firm* — Arent Fox LLP (57) ABSTRACT

A desolvation unit performs desolvation by heating after a sample solution is turned to sample mist by a nebulizer. A sample gas that contains the desolvated sample mist and a carrier gas is introduced through a sample introduction tube to a plasma torch. An addition unit for adding, to the sample introduction tube, a water-containing gas is provided. The addition unit includes a container that contains ultrapure water, a gas tube for introducing the carrier gas into the ultrapure water to cause bubbling, and a gas tube for adding the water-containing gas, to the sample introduction tube. The plasma torch generates an inductively coupled plasma under the condition that supplied power is set to a range of 550 W to 700 W. Generation of interfering molecule ions due to an element having a high ionization potential is inhibited when an element in a sample ionized by the plasma is analyzed.

6 Claims, 8 Drawing Sheets

(51) Int. Cl.
  *G01N 27/62* (2021.01)
  *H01J 49/10* (2006.01)
  *H05H 1/30* (2006.01)
(58) Field of Classification Search
  USPC .......................................... 250/281, 282, 288
  See application file for complete search history.

(56) References Cited

U.S. PATENT DOCUMENTS

| | | |
|---|---|---|
| 9,343,283 B1 | 5/2016 | Field et al. |
| 2016/0135277 A1* | 5/2016 | Duimstra ............. H01J 49/105 356/316 |

FOREIGN PATENT DOCUMENTS

| | | |
|---|---|---|
| JP | 2014-222178 A | 11/2014 |
| JP | 2015-190889 A | 11/2015 |
| JP | 2017-15676 A | 1/2017 |

* cited by examiner

SAMPLE ANALYSIS METHOD AND SAMPLE INTRODUCTION DEVICE

CROSS-REFERENCE TO RELATED APPLICATIONS

This present application is a National Stage entry of International Application No. PCT/JP2018/046916, filed Dec. 20, 2018, which claims priority to Japanese Patent Application No. 2018-059225, filed Mar. 27, 2018. The disclosures of the prior applications are incorporated by reference in their entirety herein.

FIELD OF THE INVENTION

The present disclosure relates to a method for introducing a sample to plasma to ionize the sample and analyzing an element in the ionized sample, and a device for introducing a sample to plasma.

BACKGROUND OF THE INVENTION

An inductively coupled plasma mass spectrometer (hereinafter, abbreviated as ICP-MS) supplies radio frequency power to a loading coil placed on a plasma torch to generate inductively coupled plasma, sprays an aerosolized sample solution to the center portion of the plasma, and ionizes an element contained in the sample. The ions are introduced through a plasma interface into a vacuum system, are subjected to mass separation according to a target mass by a mass spectrometer, and are then counted by a detector to identify and quantify ions (elements). The ICP-MS can simultaneously perform high-sensitivity analysis of many elements and obtain a calibration curve having a wide straight line range.

The ICP-MS includes a sample introduction unit for spraying and introducing a sample solution, a plasma torch portion for ionizing an element contained in the sprayed sample, an interface portion for taking ions into a vacuum system having a mass spectrometer, an ion lens portion for efficiently introducing the ions into the mass spectrometer, a mass separation unit for performing mass separation of the ions, and an ion detection unit for detecting the ions.

Among these, in the sample introduction unit, the sample solution is sprayed through a nebulizer, and sample mist transported by a carrier gas is sorted in a spray chamber. That is, particles having a smaller sample mist particle size are superimposed on the carrier gas and transported to the plasma torch. In general, the particle sizes of particles in the transported sample mist are sorted in the spray chamber. However, the spray chamber merely contributes to transporting sample mist containing small particles to the plasma torch. Accordingly, a sample introduction efficiency is low. Therefore, ultrasonic nebulizers or desolvated-sample introduction devices such as an APEX and a DHS have been commercialized in order to enhance the efficiency of introducing a sample to the plasma torch.

The ultrasonic nebulizer causes a sample solution to flow on the surface of an ultrasonic transducer, to turn the sample to fine mist, thereby enhancing the sample introduction efficiency as compared with a spray chamber. However, the ultrasonic nebulizer includes many glass components, and has a drawback that a solution containing hydrofluoric acid cannot be introduced. Meanwhile, the desolvated-sample introduction device, the examples of which include the APEX (manufactured by ESI) and the DHS (manufactured by IAS Inc.), include chambers designed to be resistant to hydrofluoric acid, and allow introduction of a sample containing hydrofluoric acid. In the desolvated-sample introduction device, sample mist generated by a nebulizer is heated in a heating chamber, a solvent in the sample mist is evaporated to reduce the sample mist particle sizes, and the sample mist is superimposed on a carrier gas, thereby facilitating transportation of the sample mists superimposed thereon. Furthermore, the vapor of the solvent evaporated by the heating chamber is cooled to condense the solvent and can be discharged as drainage. The structure and operation of the desolvated-sample introduction device are disclosed also in Patent Document 1.

The sample mist particle size is reduced to enhance the sample introduction efficiency through the desolvated-sample introduction device. Meanwhile, the influence of reduction of a temperature of plasma by heat of evaporation of sample mist introduced to the plasma is small due to elimination of the solvent, the plasma is maintained at a high temperature. In the ICP-MS, in a case where elements to be measured are unlikely to be influenced by interfering molecule ions due to Ar as plasma gas and another element having a high ionization potential, the elements are measured under a high-temperature plasma condition (hot plasma). However, the elements (for example, Fe) susceptible to these influences are greatly influenced by interfering molecule ions. Therefore, in a quadrupole ICP-MS, the introduced ions may be caused to pass through collision/reaction cells to selectively separate the interfering molecule ions as in Patent Document 2. However, the influence of the interfering molecule ions cannot be reduced in an ICP-MS (for example, a quadrupole ICP-MS or a high-resolution ICP-MS which does not have such cells) having no collision/reaction cells.

Therefore, radio-frequency power supplied to a plasma torch is lowered to generate plasma (cool plasma or cold plasma) having a lower temperature than in a normal case, thereby inhibiting ionization of Ar and another element having a high ionization potential and generation of interfering molecule ions, in some methods.

However, the sample mist loses most of the water content through the desolvated-sample introduction device, and the temperature of the plasma is not sufficiently reduced also in measurement under the low-temperature plasma condition. Therefore, a problem arises that generation of interfering molecule ions due to Ar and another element having a high ionization potential has an influence. The problem needs to be overcome for measurement under a low-temperature plasma condition in combined use with the desolvated-sample introduction device.

CITATION LIST

Patent Document

Patent Document 1: Japanese Laid-Open Patent Publication No. 2014-222178
Patent Document 2: Japanese Laid-Open Patent Publication No. 2017-15676

SUMMARY OF INVENTION

The present disclosure has been made in view of the aforementioned circumstances, and an object of the present disclosure is to provide a sample analysis method and a sample introduction device that introduce, to plasma, a sample gas that contains sample mist having been desolvated by heating, and a carrier gas that transports the sample mist, and can inhibit generation of interfering molecule ions due to an element having a high ionization potential when an element in a sample ionized by the plasma is analyzed.

In order to attain the aforementioned object, a sample analysis method according to one aspect of the present disclosure is directed to a sample analysis method for introducing, to plasma, a sample gas that contains sample mist having been desolvated by heating, and a carrier gas that transports the sample mist, and analyzing an element in a sample ionized by the plasma. The sample analysis method includes adding a water-containing gas as a carrier gas that contains water, to a path for introducing the sample gas to the plasma.

Furthermore, a sample introduction device according to one aspect of the present disclosure is directed to a sample introduction device which is applied to a method for introducing, to plasma, a sample gas that contains sample mist having been desolvated by heating, and a carrier gas that transports the sample mist, and analyzing an element in a sample ionized by the plasma, and which introduces the sample gas to the plasma. The sample introduction device includes: a generation unit configured to generate a water-containing gas as a carrier gas that contains water; and a path configured to add the water-containing gas generated by the generation unit to a path for introducing the sample gas to the plasma.

According to one aspect of the present disclosure, a carrier gas (water-containing gas) which contains water is added to the path for introducing, to plasma, a sample gas that contains sample mist having been desolvated by heating and a carrier gas that transports the sample mist. Therefore, a sample gas which contains water is introduced to plasma. Thus, the temperature of plasma is reduced by energy consumption caused by heat of evaporation of water, and ionization of an element having a high ionization potential, that is, generation of interfering molecule ions due to an element having a high ionization potential can be inhibited. The effect (effect of reducing the sample mist particle size and enhancing a sample introduction efficiency for introducing a sample to plasma) by desolvation can be obtained.

The water-containing gas can be generated by bubbling of the carrier gas in ultrapure water, or by immersing, in ultrapure water, a carrier gas line formed by a hollow fiber filter. The ultrapure water represents water having an extremely high purity and having an electric resistivity that exceeds 15 MΩcm.

The plasma according to one aspect of the present disclosure can be an inductively coupled plasma generated by setting supplied power to a range of 550 W to 700 W. Thus, when the plasma generation condition is the low temperature plasma condition, the temperature of plasma can be sufficiently reduced, and generation of interfering molecule ions due to an element having a high ionization potential can be inhibited. Therefore, an element (for example, Fe) that is likely to be influenced by interfering molecule ions due to an element having a high ionization potential can be accurately analyzed.

DESCRIPTION OF EMBODIMENTS

First Embodiment

Figure 1:
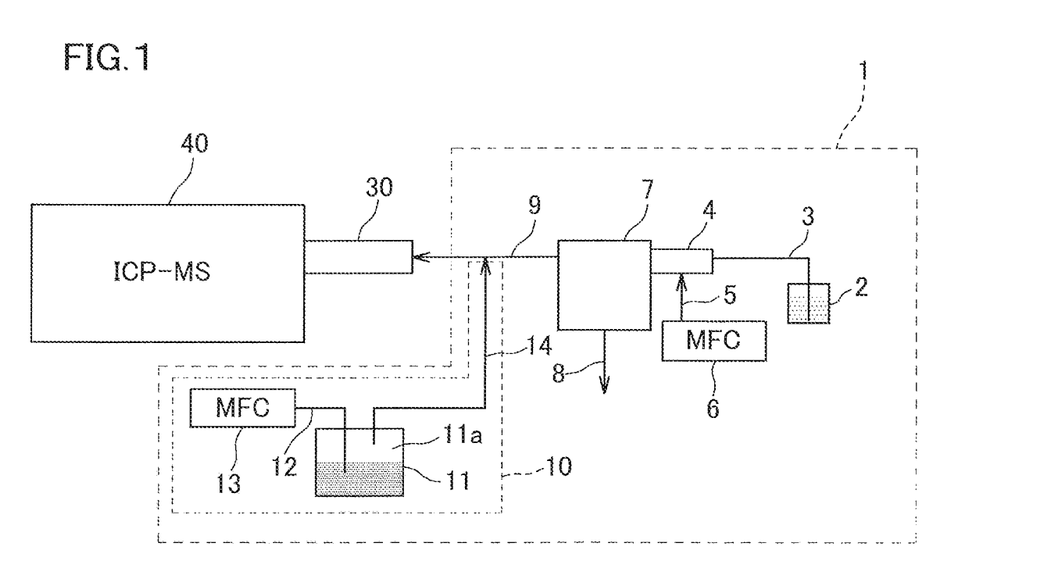
FIG. 1 illustrates a structure of an inductively coupled plasma mass spectrometer system according to a first embodiment.

A first embodiment of the present disclosure will be described below with reference to the drawings. FIG. 1 illustrates a structure of a system for analyzing an element in a sample by using an inductively coupled plasma mass spectrometry. The system shown in FIG. 1 includes a sample introduction device 1, a plasma torch 30, to which a sample is introduced from the device 1, for generating inductively coupled plasma for ionizing the introduced sample, and an analyzing unit 40 for performing mass analysis of the sample (element) ionized by the plasma torch 30. Firstly, the structure of the sample introduction device 1 will be described.

The sample introduction device 1 includes a tube 3 for suctioning a sample from a container 2 that contains a sample (sample solution) in liquid form, a nebulizer 4 for nebulizing the suctioned sample (that is, for generating sample mist), a gas tube 5 for introducing a carrier gas (hereinafter, may be referred to as nebulizer gas) into the nebulizer 4, an MFC 6 (mass flow controller) for controlling a gas flow rate in the gas tube 5, and a desolvation unit 7 for desolvating the sample mist generated by the nebulizer 4 by heating. Furthermore, the sample introduction device 1 includes a gas tube 9 (hereinafter, referred to as a sample introduction tube) for introducing, to the plasma torch 30, a sample gas that contains sample mist having been desolvated by the desolvation unit 7, and the carrier gas introduced through the gas tube 5 into the nebulizer 4, and an addition unit 10 for adding a carrier gas (hereinafter, may be referred to as water-containing gas) having a water content to the sample introduction tube 9.

The container 2 is formed of, for example, a chemical-resistant material (for example, fluororesin such as PFA (tetrafluoroethylene-perfluoroalkoxy ethylene copolymer resin)). A sample solution in the container 2 contains, for example, water, ethanol, hydrofluoric acid (hydrogen fluoride, HF), or hydrogen peroxide water, as a solvent.

The nebulizer 4 is, for example, a coaxial nebulizer made of PFA. The type of the nebulizer 4 may be other than a coaxial type. In a case where a sample solution does not contain a highly corrosive substance such as hydrofluoric acid, a glass nebulizer or an ultrasonic nebulizer may be used as the nebulizer 4. The nebulizer gas is, for example, argon gas or nitrogen gas. The flow rate of the nebulizer gas is adjusted by the MFC 6 to a predetermined rate (for example, 0.60 to 1.00 L/min).

The desolvation unit 7 includes a heating chamber (for example, a heating-type cyclone chamber) for heating sample mist generated by the nebulizer 4 to evaporate a solvent in the sample, a cooling unit for cooling the sample droplets obtained after heating and the evaporated solvent, and condensing the evaporated solvent, a pump for eliminating the solvent condensed by the cooling unit, and a drain discharge tube 8 for discharging the solvent to the outside in accordance with the operation of the pump. The desolvation unit 7 may be a commercially available desolvated-sample introduction device such as an APEX (manufactured by ESI) and a DHS (manufactured by IAS Inc.).

The desolvation unit 7 evaporates a solvent in the sample droplets by heating the sample mist in the heating chamber to reduce the size of the sample droplet to a fine size. At this time, the obtained fine sample droplets and evaporated solvent vapor are sorted from each other, to sort the sizes of the sample droplets. Thereafter, in the cooling unit, the sample droplets and the solvent vapor are cooled and then condensed, and the droplets having large sizes and the condensed solvent can be discharged through the drain discharge tube 8 connected immediately below the cooling unit. The desolvation unit 7 reduces the sample mist particle sizes, thereby facilitating transportation of the sample mist with the carrier gas. In the heating chamber of the desolvation unit 7, the heating temperature is set to be, for example, higher than a boiling point of the solvent in the sample mist. In the cooling unit of the desolvation unit 7, the cooling temperature is, for example, set so as not to solidify the solvent.

The sample introduction tube 9 has one end connected to the outlet of the desolvation unit 7, and has the other end connected to the inlet of the center tube of the plasma torch 30.

The addition unit 10 includes a container 11 which contains ultrapure water, a gas tube 12 for supplying a carrier gas into the ultrapure water in the container 11, an MFC 13 for controlling a gas flow rate in the gas tube 12, and a gas tube 14 for adding gas (water-containing gas) in the container 11 to a mid-portion of the sample introduction tube 9. The container 11 is, for example, made of PFA. In the container 11, a space 11a which is not occupied by the ultrapure water is formed above the ultrapure water.

The gas tube 12 has one end immersed in the ultrapure water in the container 11. The carrier gas (additive gas) supplied through the gas tube 12 to the container 11 is the same as, for example, the nebulizer gas. However, the carrier gas may not necessarily be the same as the nebulizer gas. The additive gas is, for example, argon gas or nitrogen gas. The gas tube 14 is provided so as to be separated from the gas tube 12. The gas tube 14 has one end disposed in the space 11a in the container 11, and has the other end connected to the mid-portion of the sample introduction tube 9. The flow rate of the water-containing gas to be added from the addition unit 10 to the sample introduction tube 9 is adjusted by the MFC 13 to a predetermined rate (for example, 0.10 to 0.50 L/min).

The sample introduction device 1 has the above-described structure. Next, the structures of the plasma torch 30 and the analyzing unit 40 will be described. The plasma torch 30 has a triple tube structure in which a center tube, an auxiliary tube that covers the surroundings (external portion) of the center tube, and an outermost tube that covers the surroundings (external portion) of the auxiliary tube are coaxially disposed. Each tube of the plasma torch 30 is made of, for example, quartz glass ($SiO_2$) or heat-resistant glass (for example, borosilicate glass in which $SiO_2$ and $B_2O_3$ are mixed). The sample gas is introduced from the sample introduction device 1 into the center tube. That is, the sample introduction tube 9 is connected to one end, in the axial direction, of the center tube. An opening that communicates with the end portion (a space in which an induction coil described below is provided and inductively coupled plasma is generated) of the outermost tube is formed at the other end of the center tube.

A gas introduction port is formed at one end side of the auxiliary tube, and auxiliary gas is introduced through the gas introduction port. The auxiliary gas prevents the generated plasma from coming into contact with the plasma torch 30, and is, for example, argon gas. An opening through which the introduced auxiliary gas is released to the end portion of the outermost tube is formed at the other end of the auxiliary tube. The flow rate of the auxiliary gas is adjusted by a not-illustrated MFC to a predetermined rate (for example, 0.6 to 1.5 L/min).

A gas introduction port is formed at one end side of the outermost tube, and a plasma gas (for example, argon gas) as a primary gas for forming plasma is introduced through the gas introduction port. The flow rate of the plasma gas is adjusted by a not-illustrated MFC to a predetermined rate (for example, 14.0 to 18.0 L/min). An induction coil is disposed around the outer circumference of the end portion (the end portion on the side opposite to the gas introduction port side) of the outermost tube. A radio frequency power supply is connected to the induction coil. A radio frequency power to be applied to the induction coil is, for example, 550 W to 700 W under a low-temperature plasma condition. The plasma gas is introduced into the outermost tube, the auxiliary gas is introduced into the auxiliary tube, and a radio frequency power is applied to the induction coil, thereby generating inductively coupled plasma at the end portion of the outermost tube.

The analyzing unit 40 includes an interface unit that includes a sampling cone and a skimmer cone for taking ions (sample) generated by plasma at the plasma torch 30 into the vacuum system having a mass spectrometer, an ion lens unit for efficiently introducing the ions that have passed through the interface unit, to the mass spectrometer, a mass separation unit for performing mass separation of the ions that have passed through the ion lens unit, an ion detection unit for detecting the ions having been subjected to the mass separation by the mass separation unit, and a calculation unit for analyzing data (mass spectrum) detected by the ion detection unit.

The structure of the system shown in FIG. 1 has been described above. Next, an operation of the system shown in FIG. 1 will be described. The sample gas which contains the carrier gas and the sample mist generated by the nebulizer 4 is introduced into the desolvation unit 7. The sample gas introduced into the desolvation unit 7 is heated and then cooled to be desolvated, thereby reducing the sample particle sizes. The carrier gas (in other words, the dry aerosolized sample) that contains the sample, having small particle sizes, which is sorted by the desolvation unit 7 is introduced through the sample introduction tube 9 into the center tube of the plasma torch 30. At this time, water-containing gas is added to the sample introduction tube 9 from the addition unit 10. That is, the carrier gas is supplied into ultrapure water in the container 11 to cause bubbling. The space 11a in the container 11 is filled with the carrier gas obtained after the bubbling, that is, the carrier gas (water-containing gas) that contains molecules (water content) of the ultrapure water. The water-containing gas in the space 11a is added to the sample introduction tube 9 through the gas tube 14.

Thus, a sample gas that contains water is introduced into the center tube of the plasma torch 30. The sample gas, containing the water, which is introduced into the center tube is introduced into the center portion of the inductively coupled plasma generated at the end portion of the plasma torch 30 to ionize the sample. The ionized sample is introduced into the analyzing unit 40 and is subjected to mass analysis.

According to the present embodiment, after the desolvation, before introduction into the plasma, water is introduced into the sample gas. Therefore, the temperature of the plasma can be sufficiently reduced by energy consumption caused by heat of evaporation of water while a sample introduction efficiency for introducing a sample to plasma based on desolvation is maintained, and ionization of an element, other than a to-be-analyzed element, which has a high ionization potential can be inhibited, that is, generation of interfering molecule ions can be inhibited. Thus, as indicated in an example described below, a detection lower limit DL (Detection Limit) and a background equivalent concentration BEC of a to-be-analyzed element can be improved. Particularly, by addition of the water-containing gas to the sample introduction tube 9, both water and the sample gas can be introduced into the center tube of the plasma torch 30, and the temperature of the plasma center portion into which the sample gas is introduced can be effectively reduced. Thus, generation of the interfering molecule ions at the plasma center portion can be inhibited.

In a case where the condition of the plasma is a low-temperature plasma condition (condition that power to be supplied to the induction coil is 550 W to 700 W), the temperature of the plasma can be reduced as compared with that in a high-temperature plasma condition (condition that power to be supplied exceeds 700 W), and generation of interfering molecule ions due to an element such as argon having a high ionization potential can be inhibited. Thus, a to-be-analyzed element (element having a mass close to a mass of an interfering molecule ion) which is likely to be influenced by the interfering molecule ions due to an element having a high ionization potential can be analyzed with high sensitivity.

Second Embodiment

Figure 2:
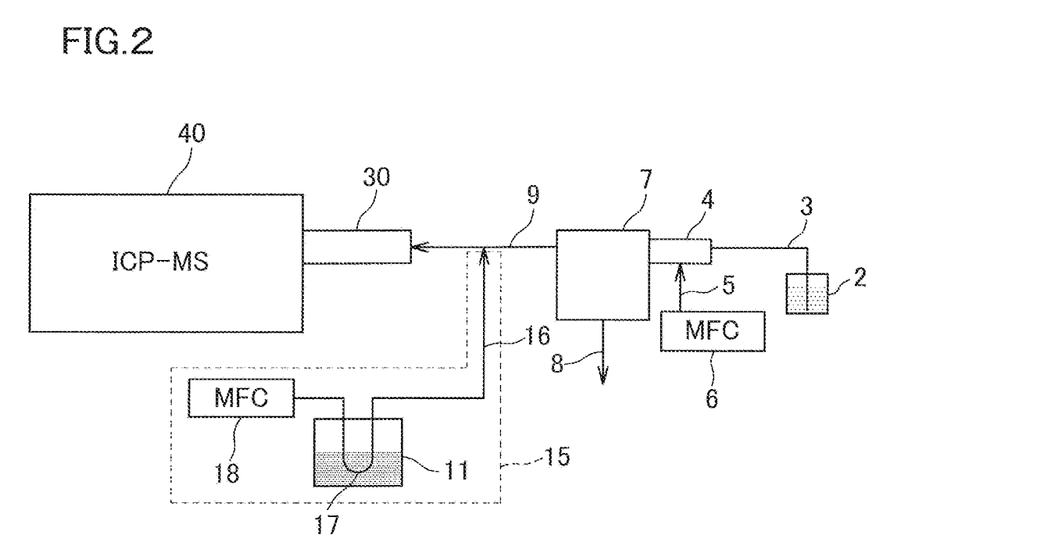
FIG. 2 illustrates a structure of an inductively coupled plasma mass spectrometer system according to a second embodiment.

Next, a second embodiment of the present disclosure will be described focusing on differences from the first embodiment. FIG. 2 illustrates a structure of an inductively coupled plasma mass spectrometer system according to the present embodiment. In FIG. 2, the same components as shown in FIG. 1 are denoted by the same reference numerals. The system shown in FIG. 2 is the same as the system shown in FIG. 1 except that the structure of an addition unit 15 is different from the structure of the addition unit 10 shown in FIG. 1.

The addition unit 15 shown in FIG. 2 includes the container 11 which contains ultrapure water, a gas tube 16, and an MFC 18 for controlling a gas flow rate in the gas tube 16. The container 11 has the same structure as shown in FIG. 1. The gas tube 16 is shaped such that an upstream portion for introducing gas into the container 11 and a downstream portion for discharging gas from the container 11 are continuous with each other. Specifically, a portion 17 of the gas tube 16 is formed by a hollow fiber membrane tube (hollow fiber filter), and is provided so as to be immersed in the ultrapure water in the container 11. The hollow fiber filter portion 17 is structured such that a certain amount of water molecules in the ultrapure water can permeate the hollow fiber filter portion 17 through the wall surface of the hollow fiber filter portion 17. At this time, an amount of water that permeates the hollow fiber filter portion 17 and the sizes of permeating particles are adjusted by the hollow fiber filter portion 17 such that the water that has permeated the hollow fiber filter portion 17 is transported by the carrier gas.

The upstream portion (gas tube portion for supplying the carrier gas to the container 11) of the gas tube 16 is connected to one end of the hollow fiber filter portion 17, and the downstream portion (gas tube portion for introducing water-containing gas from the container 11 into the sample introduction tube 9) of the gas tube 16 is connected to the other end of the hollow fiber filter portion 17. The end portion of the downstream portion of the gas tube 16 is connected to the sample introduction tube 9. The MFC 18 is provided at the upstream portion of the gas tube 16. A portion, of the gas tube 16, other than the portion 17 that is immersed in ultrapure water is formed of a typical material (material that does not allow molecules to pass between the inner side and the outer side of the tube) for the gas tube. Carrier gas such as argon gas flows through the gas tube 16.

The operation of the addition unit 15 will be described. Water from the ultrapure water is supplied, in the hollow fiber filter portion 17, to the carrier gas that flows through the gas tube 16. Thereafter, the carrier gas that contains water is added to the sample introduction tube 9. Thus, the same operational effect as in FIG. 1 is obtained also in the system shown in FIG. 2.

EXAMPLES

The present disclosure will be specifically described by using examples. However, this invention is not limited to the examples.

Example

The system shown in FIG. 1 was used to obtain a detection lower limit DL and a background equivalent concentration BEC of each element. At this time, a 100 µL/minute microflow nebulizer made of PFA was used as the nebulizer 4, and a DHS (desolvated-sample introduction device) manufactured by IAS Inc. was used as the desolvation unit 7. The set parameters were nebulizer gas: 0.8 L/minute, carrier gas (additive gas) containing water to be added to the sample introduction tube 9: 0.2 L/minute, heating temperature in the desolvation unit 7: 120° C., and cooling temperature: 2° C. Furthermore, each of the nebulizer gas and the additive gas was argon gas. A high-resolution ICP-MS (ELEMENT2) manufactured by Thermo Fisher Scientific was used as the analyzing unit (ICP-MS). The set parameters were plasma gas: 16 L/minute, auxiliary gas: 0.8 L/minute, and RF_POWER: 650 W such that the condition was a low temperature plasma condition. Each of the plasma gas and the auxiliary gas was argon gas. The container 11 in the addition unit 10 was made of PFA, and contained 250 mL of ultrapure water.

Under these conditions, interfering molecule ions which interfered when Na (mass number 23), Mg (mass number 24), Al (mass number 27), Ca (mass number 44), Ti (mass number 48), Cr (mass number 52), Mn (mass number 55), Fe (mass number 56), Ni (mass number 60), Cu (mass number 63), and Zn (mass number 64) in 1% HF/5% $H_2O_2$ solution were measured, and a detection lower limit DL and a background equivalent concentration BEC of each element in a measurement in which a mass resolution of the analyzing unit 40 (ICP-MS) was set to 4000, were obtained.

The detection lower limit DL represents the lowest detectable concentration of a to-be-analyzed element in a sample. Specifically, the detection lower limit DL represents a concentration based on three times the standard deviation σ of a background intensity and is defined by the following equation 1.

[Math. 1]

$$DL = \frac{3 \times \text{standard deviation of blank strength} (cps) \times \text{concentration of reference sample} (ppt)}{\text{strength of reference sample} (cps) - \text{blank strength} (cps)} \quad \text{Equation 1}$$

In Equation 1, the "blank strength" represents an ionic strength (the unit is cps) of each element detected by the ICP-MS when a blank solution (solution containing no to-be-analyzed elements) is used. The "concentration of reference sample" represents a concentration (the unit is ppt), of each element, in a reference solution (solution prepared such that the concentration of a to-be-analyzed element in the blank solution has a predetermined value). The "strength of reference sample" represents an ionic strength (the unit is cps) of each element detected by the ICP-MS when the reference solution is used. The above-described 1% HF/5% $H_2O_2$ solution was used as each of the blank solution and the reference solution. The detection lower limit DL depends on stability of the blank strength.

The background equivalent concentration BEC represents a concentration of a to-be-analyzed element based on a signal strength equivalent to a background intensity, and defined by the following equation 2. The background equivalent concentration BEC depends on the blank strength.

[Math. 2]

$$BEC = \frac{\text{blank strength} (cps) \times \text{concentration of reference sample} (ppt)}{\text{strength of reference sample} (cps) - \text{blank strength} (cps)} \quad \text{Equation 2}$$

Comparative Examples 1 and 2

Figure 3:
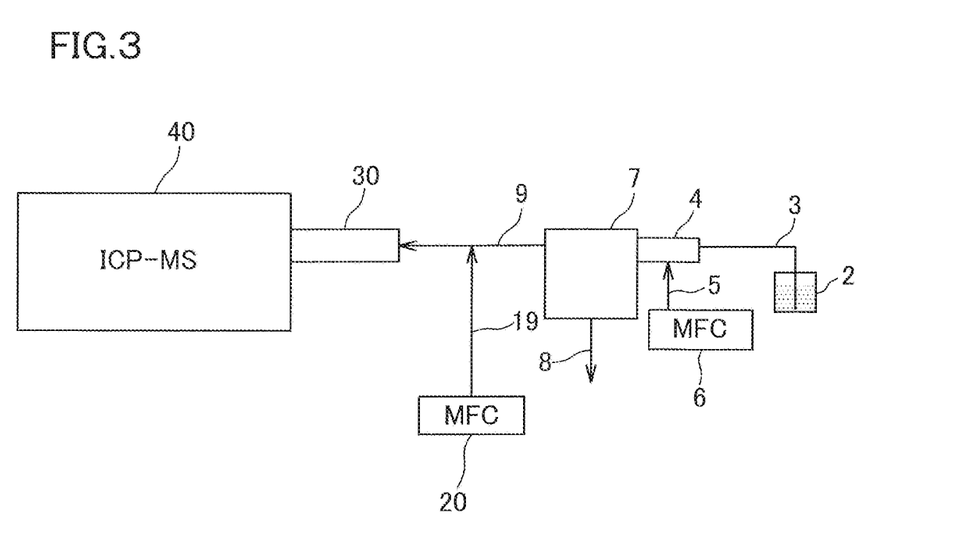
FIG. 3 illustrates a structure of an inductively coupled plasma mass spectrometer system according to comparative examples.
Figure 4:
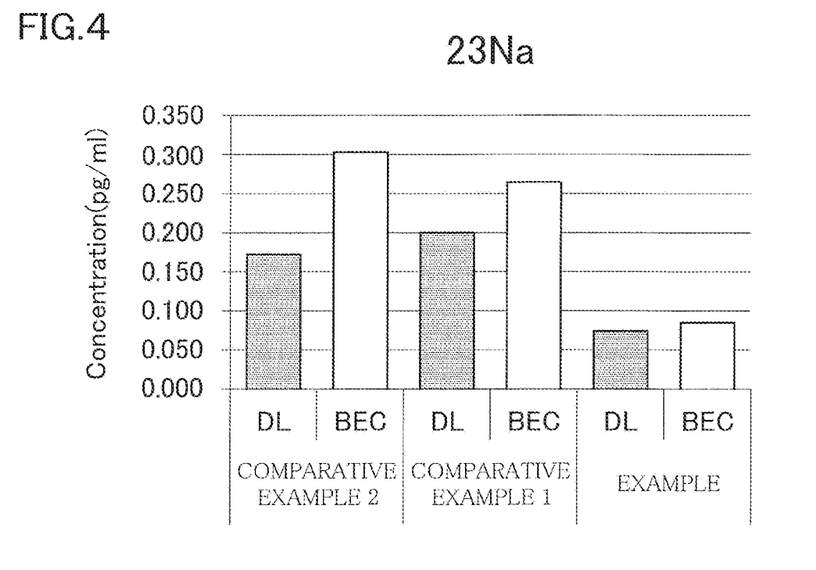
FIG. 4 illustrates comparison in a detection lower limit DL and a background equivalent concentration BEC for Na among example, and comparative examples 1 and 2.
Figure 5:
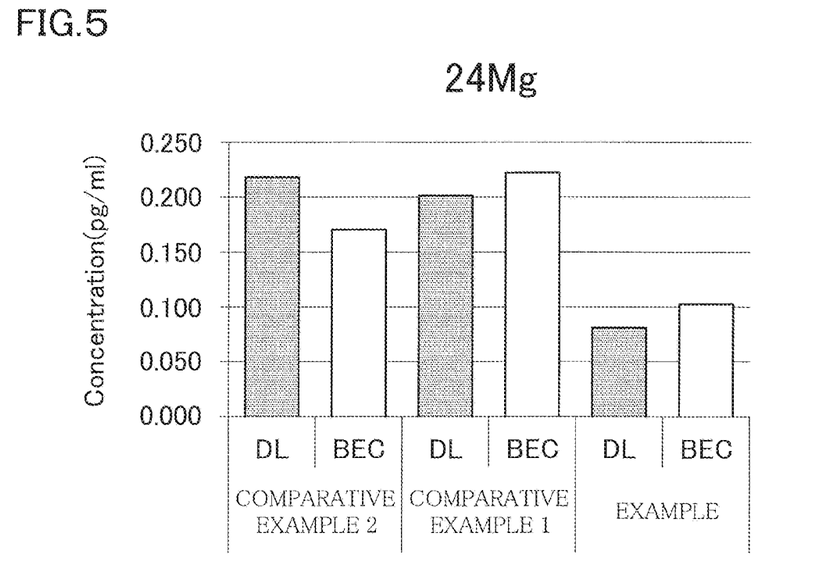
FIG. 5 illustrates comparison in a detection lower limit DL and a background equivalent concentration BEC for Mg among example, and comparative examples 1 and 2.
Figure 6:
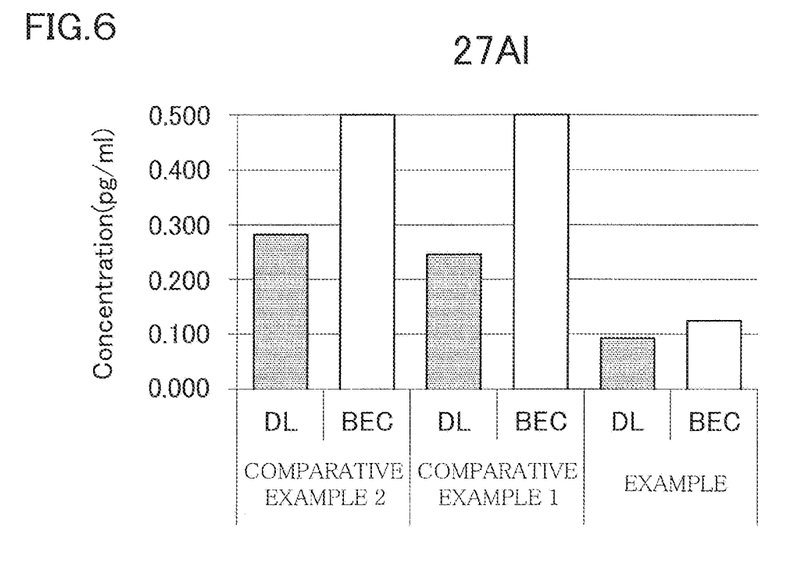
FIG. 6 illustrates comparison in a detection lower limit DL and a background equivalent concentration BEC for Al among example, and comparative examples 1 and 2.
Figure 7:
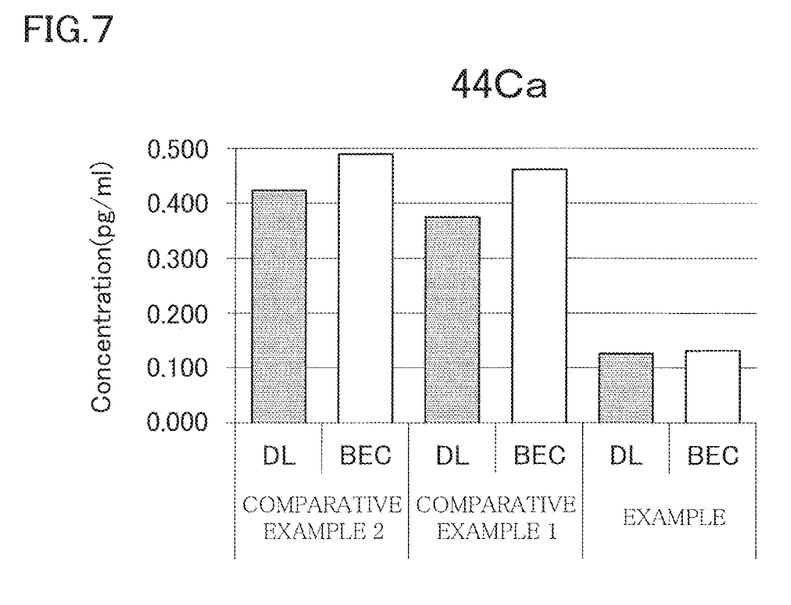
FIG. 7 illustrates comparison in a detection lower limit DL and a background equivalent concentration BEC for Ca among example, and comparative examples 1 and 2.
Figure 8:
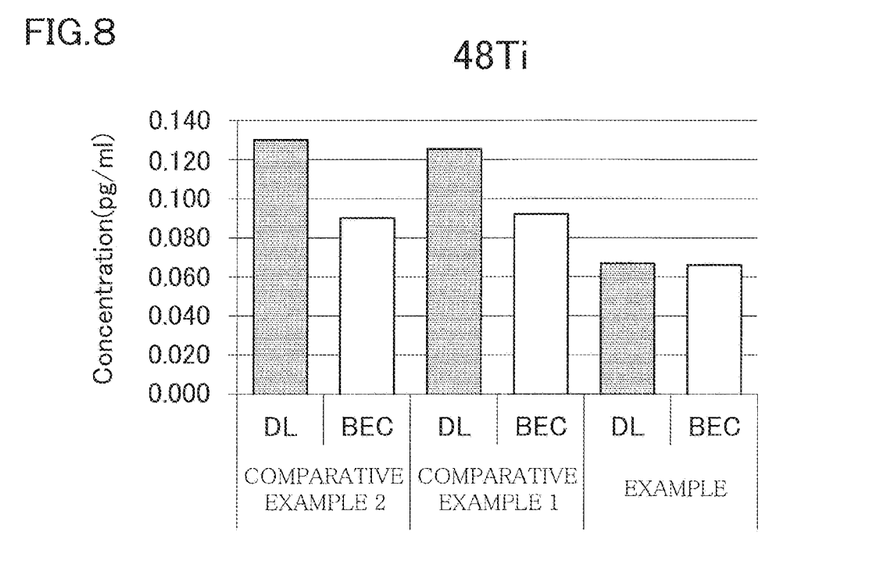
FIG. 8 illustrates comparison in a detection lower limit DL and a background equivalent concentration BEC for Ti among example, and comparative examples 1 and 2.
Figure 9:
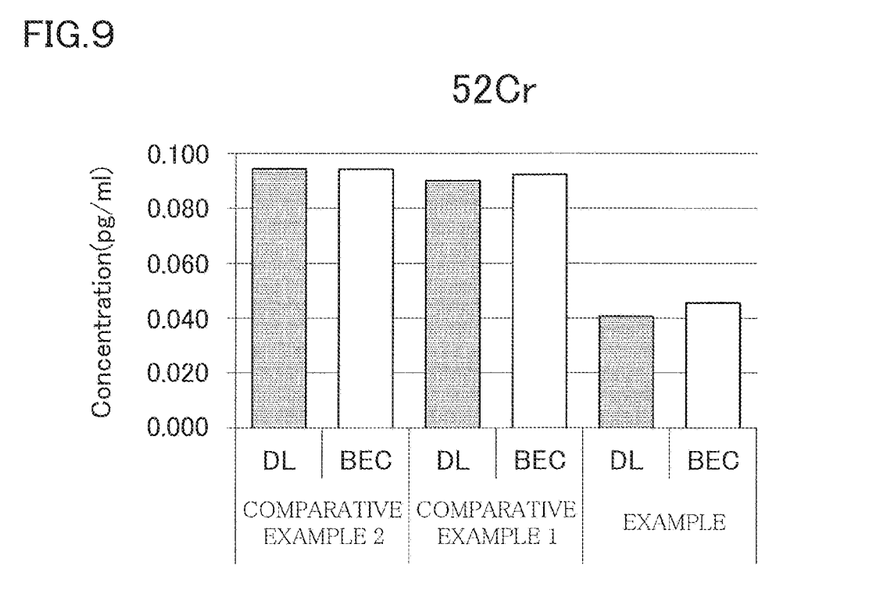
FIG. 9 illustrates comparison in a detection lower limit DL and a background equivalent concentration BEC for Cr among example, and comparative examples 1 and 2.
Figure 10:
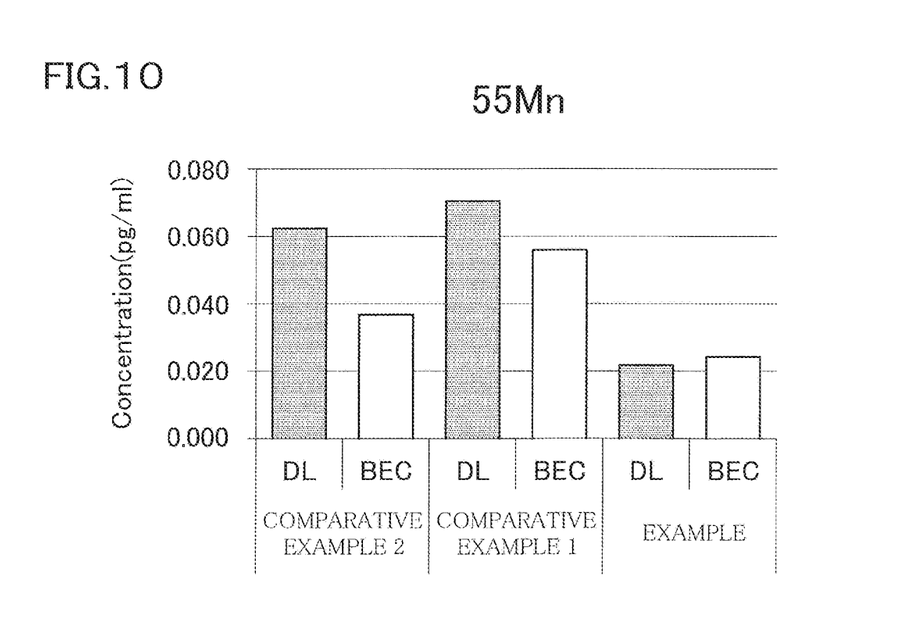
FIG. 10 illustrates comparison in a detection lower limit DL and a background equivalent concentration BEC for Mn among example, and comparative examples 1 and 2.
Figure 11:
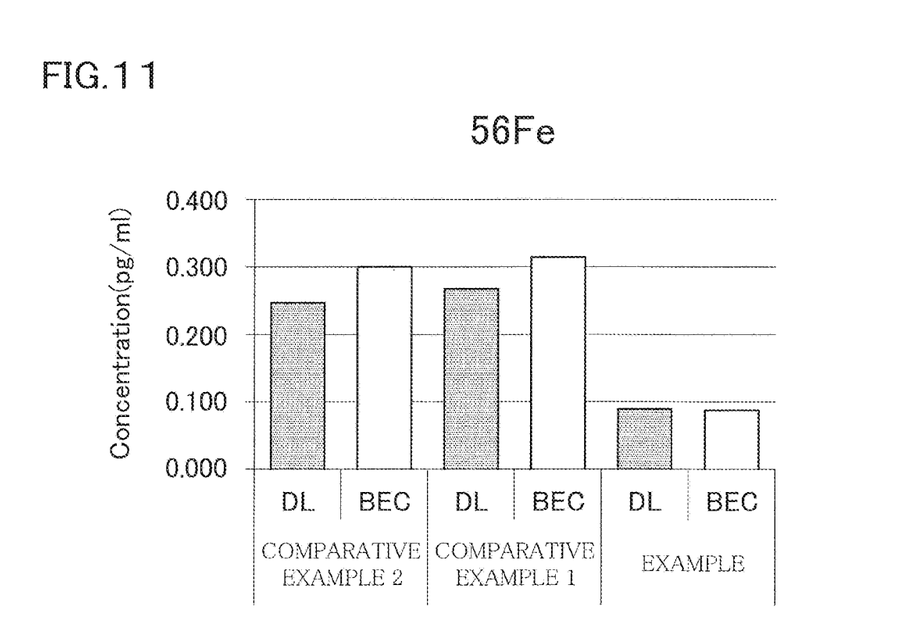
FIG. 11 illustrates comparison in a detection lower limit DL and a background equivalent concentration BEC for Fe among example, and comparative examples 1 and 2.
Figure 12:
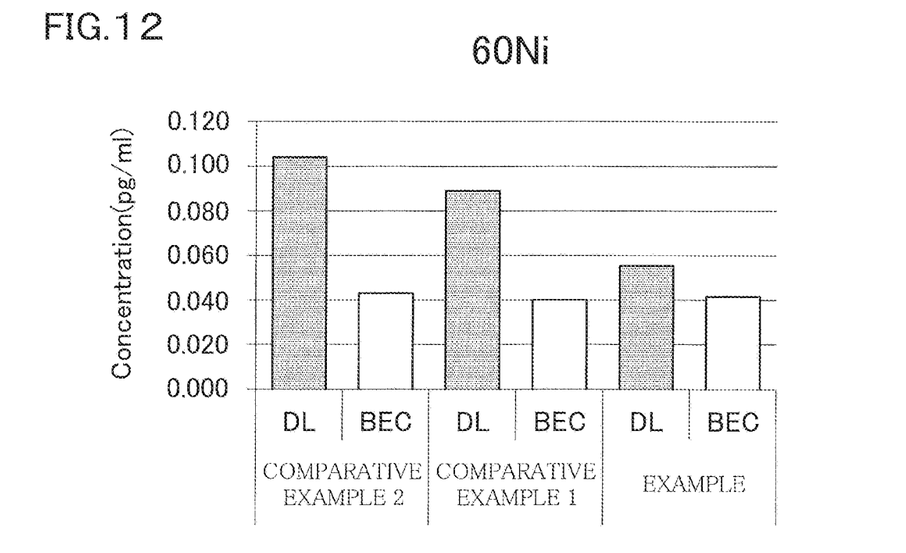
FIG. 12 illustrates comparison in a detection lower limit DL and a background equivalent concentration BEC for Ni among example, and comparative examples 1 and 2.
Figure 13:
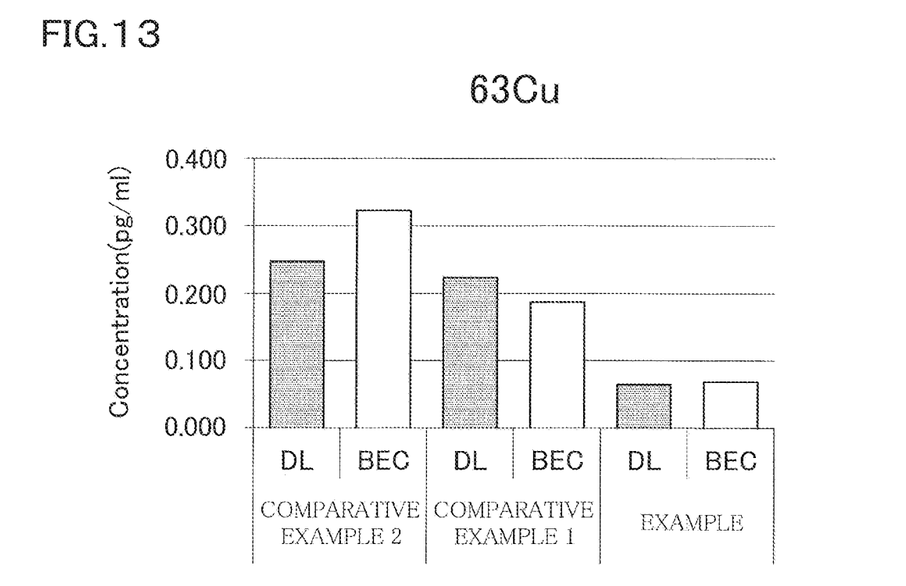
FIG. 13 illustrates comparison in a detection lower limit DL and a background equivalent concentration BEC for Cu among example, and comparative examples 1 and 2.
Figure 14:
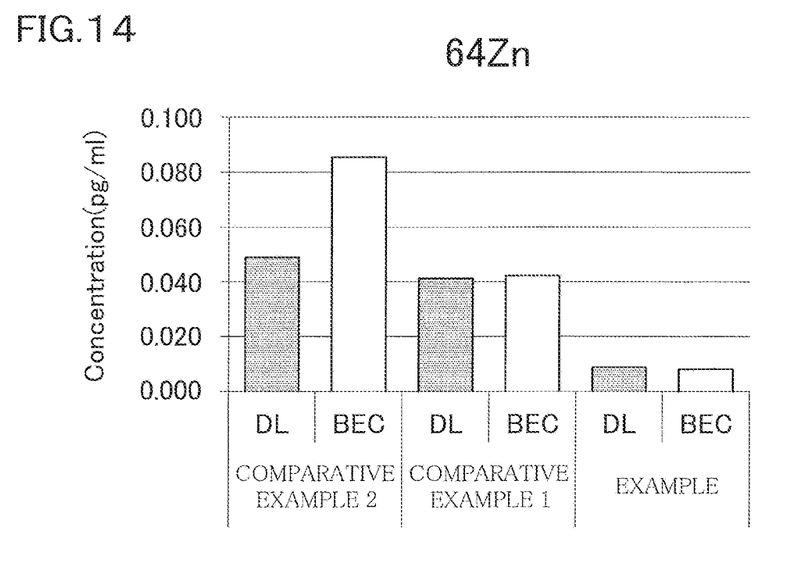
FIG. 14 illustrates comparison in a detection lower limit DL and a background equivalent concentration BEC for Zn among example, and comparative examples 1 and 2.

In comparative examples 1 and 2, a system shown in FIG. 3 was used to obtain the detection lower limit DL and the background equivalent concentration BEC of each element. In FIG. 3, the same components as shown in FIG. 1 are denoted by the same reference numerals. The system shown in FIG. 3 was different from the system structure (the system shown in FIG. 1) used in the above-described example in that water was not added to a sample gas in the system shown in FIG. 3. Except for this point, the system shown in FIG. 3 had the same system structure as used in the example. That is, in the system shown in FIG. 3, a gas tube 19 for adding argon gas was connected to a mid-portion of the sample introduction tube 9, and an MFC 20 for controlling a gas flow rate in the gas tube 19 was provided. However, water was not added to argon gas flowing in the gas tube 19.

In comparative example 1, the set parameters (the flow rate of each gas, the heating temperature and cooling temperature in the desolvation unit, RF_POWER) were the same as in the example (that is, low-temperature plasma condition). In comparative example 2, the set parameters were the same as in the example except for the RF_POWER, and the RF_POWER was 1200 W, that is, the condition was a high-temperature plasma condition.

Under these conditions, interfering molecule ions which interfered when Na (mass number 23), Mg (mass number 24), Al (mass number 27), Ca (mass number 44), Ti (mass number 48), Cr (mass number 52), Mn (mass number 55), Fe (mass number 56), Ni (mass number 60), Cu (mass number 63), and Zn (mass number 64) in 1% HF/5% $H_2O_2$ solution were measured, and a detection lower limit DL and a background equivalent concentration BEC of each element in a measurement in which the mass resolution of the analyzing unit 40 (ICP-MS) was set to 4000, were obtained. The detection lower limit DL and the background equivalent concentration BEC were defined by the above-described Equation 1 and Equation 2.

(Result)

Table 1 indicates the result of example, Table 2 indicates the result of comparative example 1, and Table 3 indicates the result of comparative example 2. In the right-side cells in Tables 1 to 3, ions each having a mass number approximate to that of each to-be-alanlyzed element are indicated as interfering ions (interfering molecule ions). FIG. 4 to FIG. 14 each illustrate comparison in the detection lower limit DL and the background equivalent concentration BEC for each to-be-analyzed element among the example, and comparative examples 1 and 2.

TABLE 1

| | Mass resolution | DL | BEC | Interfering ion (ppt) |
|---|---|---|---|---|
| 23Na | 4000 | 0.074 | 0.084 | BC |
| 24Mg | 4000 | 0.081 | 0.103 | $C_2$ |
| 27Al | 4000 | 0.091 | 0.122 | CN, CNH, BO |
| 44Ca | 4000 | 0.124 | 0.13 | SiO, $CO_2$, $N_2O$ |
| 48Ti | 4000 | 0.067 | 0.065 | ArC, SiO, SiF |
| 52Cr | 4000 | 0.041 | 0.045 | ArC, ArN, ArO |
| 55Mn | 4000 | 0.022 | 0.025 | ArN, ArF |
| 56Fe | 4000 | 0.089 | 0.087 | ArO, $Si_2$ |
| 60Ni | 4000 | 0.055 | 0.041 | $Si_2$, SiO |
| 63Cu | 4000 | 0.067 | 0.072 | SiOF, SiNF |
| 64Zn | 4000 | 0.098 | 0.089 | SiOF |

TABLE 2

| | Mass resolution | DL | BEC | Interfering ion (ppt) |
|---|---|---|---|---|
| 23Na | 4000 | 0.201 | 0.265 | BC |
| 24Mg | 4000 | 0.202 | 0.223 | $C_2$ |
| 27Al | 4000 | 0.245 | 1.425 | CN, CNH, BO |
| 44Ca | 4000 | 0.378 | 0.465 | SiO, $CO_2$, $N_2O$ |
| 48Ti | 4000 | 0.126 | 0.092 | ArC, SiO, SiF |
| 52Cr | 4000 | 0.089 | 0.091 | ArC, ArN, ArO |
| 55Mn | 4000 | 0.071 | 0.056 | ArN, ArF |
| 56Fe | 4000 | 0.268 | 0.311 | ArO, $Si_2$ |
| 60Ni | 4000 | 0.089 | 0.04 | $Si_2$, SiO |
| 63Cu | 4000 | 0.224 | 0.187 | SiOF, SiNF |
| 64Zn | 4000 | 0.415 | 0.425 | SiOF |

TABLE 3

| | Mass resolution | DL | BEC | Interfering ion (ppt) |
|---|---|---|---|---|
| 23Na | 4000 | 0.173 | 0.303 | BC |
| 24Mg | 4000 | 0.22 | 0.171 | $C_2$ |
| 27Al | 4000 | 0.286 | 3.652 | CN, CNH, BO |
| 44Ca | 4000 | 0.426 | 0.49 | SiO, $CO_2$, $N_2O$ |
| 48Ti | 4000 | 0.132 | 0.09 | ArC, SiO, SiF |
| 52Cr | 4000 | 0.093 | 0.093 | ArC, ArN, ArO |
| 55Mn | 4000 | 0.063 | 0.037 | ArN, ArF |
| 56Fe | 4000 | 0.247 | 0.299 | ArO, $Si_2$ |
| 60Ni | 4000 | 0.104 | 0.042 | $Si_2$, SiO |
| 63Cu | 4000 | 0.26 | 0.322 | SiOF, SiNF |
| 64Zn | 4000 | 0.49 | 0.854 | SiOF |

Comparison between comparative examples 1 and 2 indicated that the detection lower limit DL and the background equivalent concentration BEC were slightly improved in most of the elements analyzed at the time, by changing the high-temperature plasma condition in comparative example 2 to the low-temperature plasma condition in comparative example 1.

Meanwhile, comparison between the example, and comparative examples 1 and 2 indicated that the detection lower limit DL and the background equivalent concentration BEC in the example were improved from the values in comparative examples 1 and 2. Specifically, the detection lower limit DL and the background equivalent concentration BEC of all the elements except for the background equivalent concentration BEC of Ni in the example were improved from the values in comparative examples 1 and 2. The background equivalent concentration BEC of Ni had an equivalent value among the example, and comparative examples 1 and 2.

Thus, by adding water to a sample gas after desolvation before plasma is introduced, the temperature of the plasma in the low-temperature plasma condition is reduced, and excitation of an element such as argon having a high ionization potential can be inhibited, and generation of interfering molecule ions thus caused can be inhibited, so that the effects of reducing a background signal strength and improving a detection lower limit can be exerted.

This invention is not limited to the above embodiment. The embodiment is merely an example, and any embodiment having substantially the same configuration and having the same operational effects as those of the technical idea described in claims of this invention is incorporated into a technical scope of this invention.

DESCRIPTION OF THE REFERENCE CHARACTERS 1 sample introduction device
4 nebulizer
7 desolvation unit
9 sample introduction tube
10, 15 addition unit
11 container (water-containing gas generation unit)
14, 16 gas tube (additive gas introduction tube)
17 hollow fiber filter portion
30 plasma torch
40 analyzing unit

The invention claimed is:

1. A sample analysis method for introducing, to plasma, a sample gas that contains sample mist having been desolvated by heating, and a carrier gas that transports the sample mist, and analyzing an element in a sample ionized by the plasma, the sample analysis method comprising
adding a water-containing gas as a carrier gas that contains water, to a path for introducing the sample gas to the plasma;
wherein the water-containing gas is generated by bubbling of the carrier gas in ultrapure water.

2. A sample analysis method for introducing, to plasma, a sample gas that contains sample mist having been desolvated by heating, and a carrier gas that transports the sample mist, and analyzing an element in a sample ionized by the plasma, the sample analysis method comprising
adding a water-containing gas as a carrier gas that contains water, to a path for introducing the sample gas to the plasma; wherein the water-containing gas is generated by immersing, in ultrapure water, a carrier gas line formed by a hollow fiber filter.

3. The sample analysis method according to claim 1, wherein the plasma is an inductively coupled plasma generated by setting supplied power to a range of 550 W to 700 W.

4. A sample introduction device applied to a method for introducing, to plasma, a sample gas that contains sample mist having been desolvated by heating, and a carrier gas that transports the sample mist, and analyzing an element in a sample ionized by the plasma, the sample introduction device introducing the sample gas to the plasma, the sample introduction device comprising:
a generation unit configured to generate a water-containing gas as a carrier gas that contains water; and
a path configured to add the water-containing gas generated by the generation unit to a path for introducing the sample gas to the plasma;
wherein the generation unit generates the water-containing gas by bubbling of the carrier gas in ultrapure water.

5. A sample introduction device applied to a method for introducing, to plasma, a sample gas that contains sample mist having been desolvated by heating, and a carrier gas that transports the sample mist, and analyzing an element in a sample ionized by the plasma, the sample introduction device introducing the sample gas to the plasma, the sample introduction device comprising:
a generation unit configured to generate a water-containing gas as a carrier gas that contains water; and
a path configured to add the water-containing gas generated by the generation unit to a path for introducing the sample gas to the plasma; wherein the generation unit generates the water-containing gas by immersing, in ultrapure water, a carrier gas line formed by a hollow fiber filter.

6. The sample introduction device according to claim 4, wherein the plasma is an inductively coupled plasma generated by setting supplied power to a range of 550 W to 700 W.

\* \* \* \* \*